US009531596B2

(12) United States Patent
Volpe et al.

(10) Patent No.: US 9,531,596 B2
(45) Date of Patent: Dec. 27, 2016

(54) SYSTEM AND METHOD FOR DYNAMICALLY POWER AND PERFORMANCE OPTIMIZED SERVER INTERCONNECTS

(71) Applicant: III HOLDINGS 2, LLC, Wilmington, DE (US)

(72) Inventors: Thomas A. Volpe, Austin, TX (US); Mark Davis, Austin, TX (US); David Borland, Austin, TX (US); Ken Goss, Round Rock, TX (US)

(73) Assignee: III HOLDINGS 2, LLC, Wilmington, DE (US)

( * ) Notice: Subject to any disclaimer, the term of this patent is extended or adjusted under 35 U.S.C. 154(b) by 35 days.

(21) Appl. No.: 14/596,584

(22) Filed: Jan. 14, 2015

(65) Prior Publication Data

US 2015/0131680 A1     May 14, 2015

Related U.S. Application Data

(63) Continuation of application No. 13/659,752, filed on Oct. 24, 2012, now Pat. No. 8,958,301.

(60) Provisional application No. 61/553,143, filed on Oct. 28, 2011.

(51) Int. Cl.
| | |
|---|---|
| *H04L 12/24* | (2006.01) |
| *H04L 12/825* | (2013.01) |
| *H04L 12/931* | (2013.01) |
| *H04L 12/935* | (2013.01) |

(52) U.S. Cl.
CPC ........... *H04L 41/0896* (2013.01); *H04L 47/25* (2013.01); *H04L 49/30* (2013.01); *H04L 49/351* (2013.01); *H04L 49/40* (2013.01)

(58) Field of Classification Search
None
See application file for complete search history.

(56) References Cited

U.S. PATENT DOCUMENTS

| | | | |
|---|---|---|---|
| 7,558,874 B1 * | 7/2009 | Kodukula | H04L 43/0894 709/233 |
| 2005/0259685 A1 | 11/2005 | Chang et al. | |
| 2006/0242342 A1 | 10/2006 | Sarkar et al. | |
| 2008/0056284 A1 * | 3/2008 | Powell | H04L 5/14 370/401 |
| 2008/0082840 A1 | 4/2008 | Kendall et al. | |
| 2008/0205437 A1 | 8/2008 | Cole | |
| 2008/0310432 A1 * | 12/2008 | Ranjan | H04L 47/10 370/401 |
| 2009/0157865 A1 | 6/2009 | Winter | |
| 2009/0317073 A1 | 12/2009 | Hotchkiss et al. | |
| 2009/0327506 A1 | 12/2009 | Diab | |
| 2010/0150163 A1 * | 6/2010 | Ahn | H04L 12/12 370/401 |

(Continued)

OTHER PUBLICATIONS

International Search Report and Written Opinion on PCT/US12/62247, mailed Jan. 9, 2013.

(Continued)

*Primary Examiner* — Gary Mui

(57) ABSTRACT

A system and method for packet switching functionality focused on network aggregation that reduces size and power requirements of typical systems are provided in which the system and method also increases bandwidth and reduces latency from typical deployed systems.

20 Claims, 6 Drawing Sheets

(56) References Cited

U.S. PATENT DOCUMENTS

2010/0316065 A1   12/2010   Kapil et al.
2012/0251099 A1   10/2012   Khatana et al.
2013/0003559 A1*   1/2013   Matthews ........... H04L 43/0876
                                                                     370/241

OTHER PUBLICATIONS

Non-Final Office Action on U.S. Appl. No. 13/659,752, mailed May 6, 2014.
Notice of Allowance on U.S. Appl. No. 13/659,752, mailed Oct. 10, 2014.

* cited by examiner

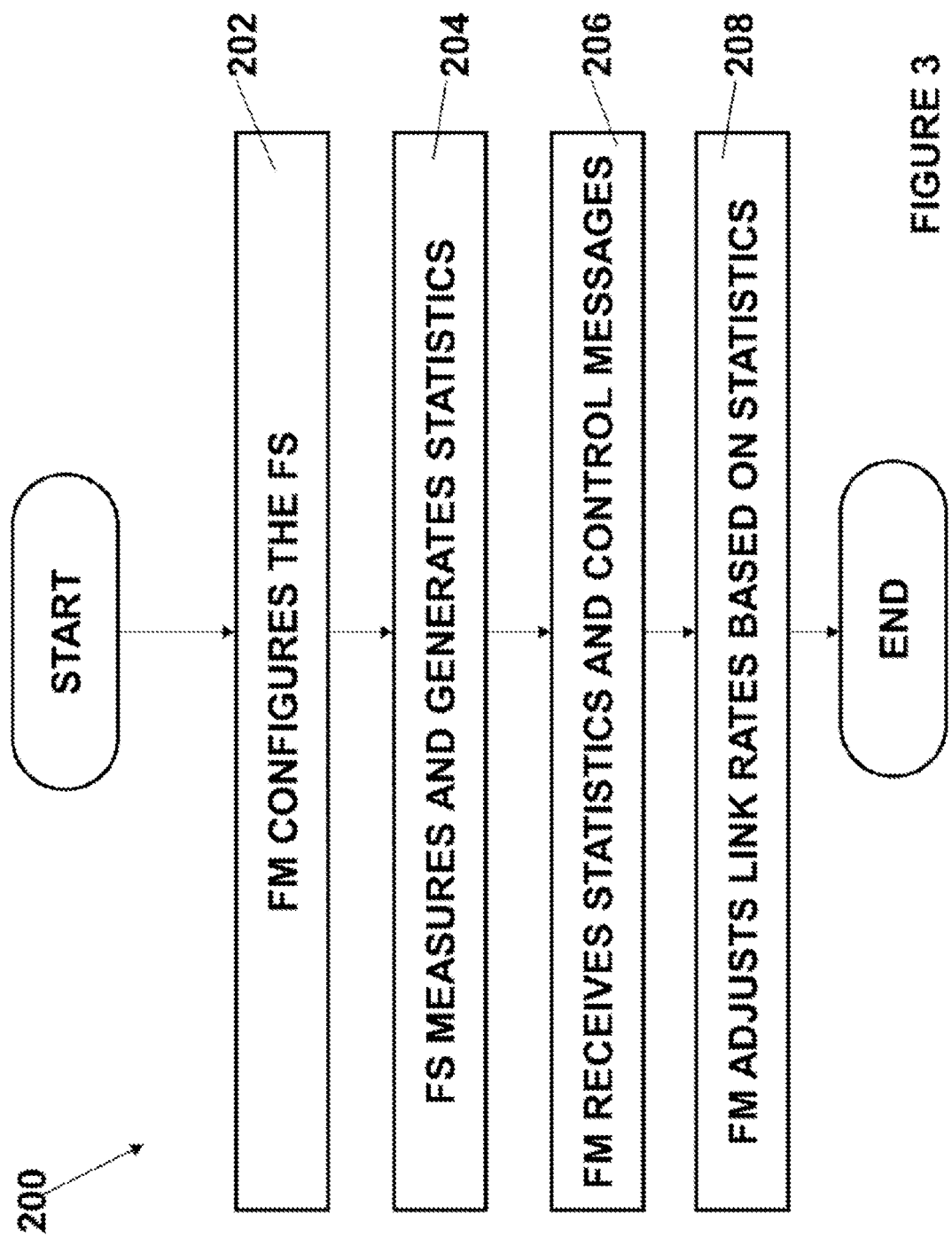

SYSTEM AND METHOD FOR DYNAMICALLY POWER AND PERFORMANCE OPTIMIZED SERVER INTERCONNECTS

CROSS-REFERENCE TO RELATED PATENT APPLICATIONS

This application is a Continuation of U.S. application Ser. No. 13/659,752, filed Oct. 24, 2012, incorporated herein by reference in its entirety, which claims priority from Provisional Application U.S. Application 61/553,143, filed Oct. 28, 2011, incorporated herein by reference in its entirety.

BACKGROUND

With the continued growth of the internet, web-based companies and systems and the proliferation of computers, there are numerous data centers that house multiple server computers in a location that is temperature controlled and can be externally managed as is well known.

What is needed is a system and method for packet switching functionality focused on network aggregation that reduces size and power requirements of typical systems, increasing bandwidth and reducing latency from typical deployed systems.

BRIEF DESCRIPTION OF THE DRAWINGS

FIG. 3 illustrates a method for dynamic link management by the fabric management unit of the node in FIG. 2;

DETAILED DESCRIPTION

The disclosure is particular applicable to the network topology and server node example described below, but the concepts herein apply to various network topologies and various server node implementations.

Figure 1:
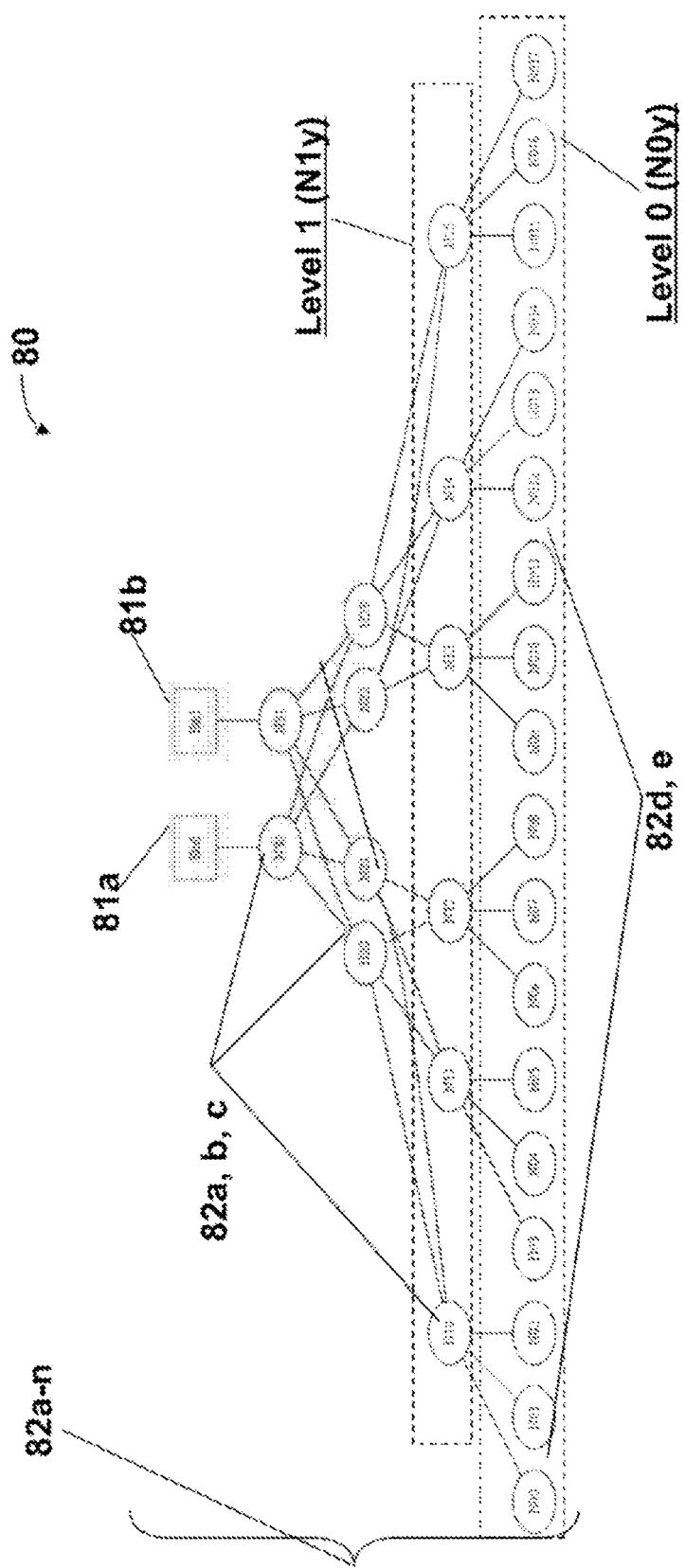
FIG. 1 illustrates an example of a high-level topology of a network system.

FIG. 1 shows an example of a high-level topology 80 of the network system that illustrates compute nodes connected by a switched interconnect fabric. Network ports 81a and 81b come from the top of the fabric to provide external network connectivity. These network ports are typically Ethernet, but other types of networking including Infiniband are common. The one or more ovals 82a-n are each a compute node that comprise both computational processors as well as a fabric switch. The fabric switch on a compute node has multiple links connected to the fabric switches in neighboring compute nodes. The fabric switches on all of the compute nodes together form a distributed interconnect fabric switch which provides connectivity between all compute nodes and connectivity to the network ports and I/o.

A recommended implementation for the interconnect links is multi-lane XAUI. In the preferred solution, a four-lane XAUI interconnect is used. Each of the four lanes can also have the speed varied from 1 Gb/sec (SGMII), XAUI rate (3.125 Gb/sec), and double XAUI (6.25 Gb/sec). The actual number of lanes and variability of speeds of each lane are implementation specific, and not important to the described innovations. Other interconnect technologies can be used that have a means to adaptively change the effective bandwidth, by varying some combination of link speeds and widths.

Power consumption of a link is usually related to the delivered bandwidth of the link. By reducing the delivered bandwidth of the link, either through link speed or width, the power consumption of the link can be reduced. Increasing or reducing bandwidth of links either through changing the link speed (i.e. increasing or decreasing frequency) or through changing the link width (i.e. enabling or disabling lanes) will collectively be referred to as changing Link Rates.

In FIG. 1, the switching layers use all five XAUI links for switching. Level 0 leaf nodes 82d, e (i.e., N0n nodes, or Nxy, where x=level and y=item number) only use one XAUI link to attach to the fabric, leaving four high-speed ports that can be used as XAUI, 10 Gbps Ethernet, PCIe, SATA, etc., for attachment to I/O. The vast majority of trees and fat trees have active nodes only as leaf nodes, and the other nodes are pure switching nodes. This approach makes routing much more straightforward. The topology 80 has the flexibility to permit every node to be a combination computational and switch node, or just a switch node. Most tree-type implementations have I/O on the leaf nodes, but topology 80 let the I/O be on any node. In general, placing the Ethernet at the top of the tree minimizes the average number of hops to the Ethernet.

In the system, a node of the topology contains a fabric switch (FS) which continuously takes measurements, interrupts control software based on measurements, allows software to make decisions on changing Link Rates based on measurements, allows software to negotiate Link Rates with links partners, and allows software to initiate Link Rates changes and re-establish communication at the new Link Rate. The software exposes a set of rules and policies to optionally allow system administrators to control and configure the dynamic Link Rate adjustment in order to optimize power and performance in their system. The resulting dynamic Link Rate adjustments are a collaboration of hardware and software. However, the exact division of which tasks are done in hardware and which tasks are done in software is implementation specific, and other embodiments of the same invention are possible.

Figure 5:
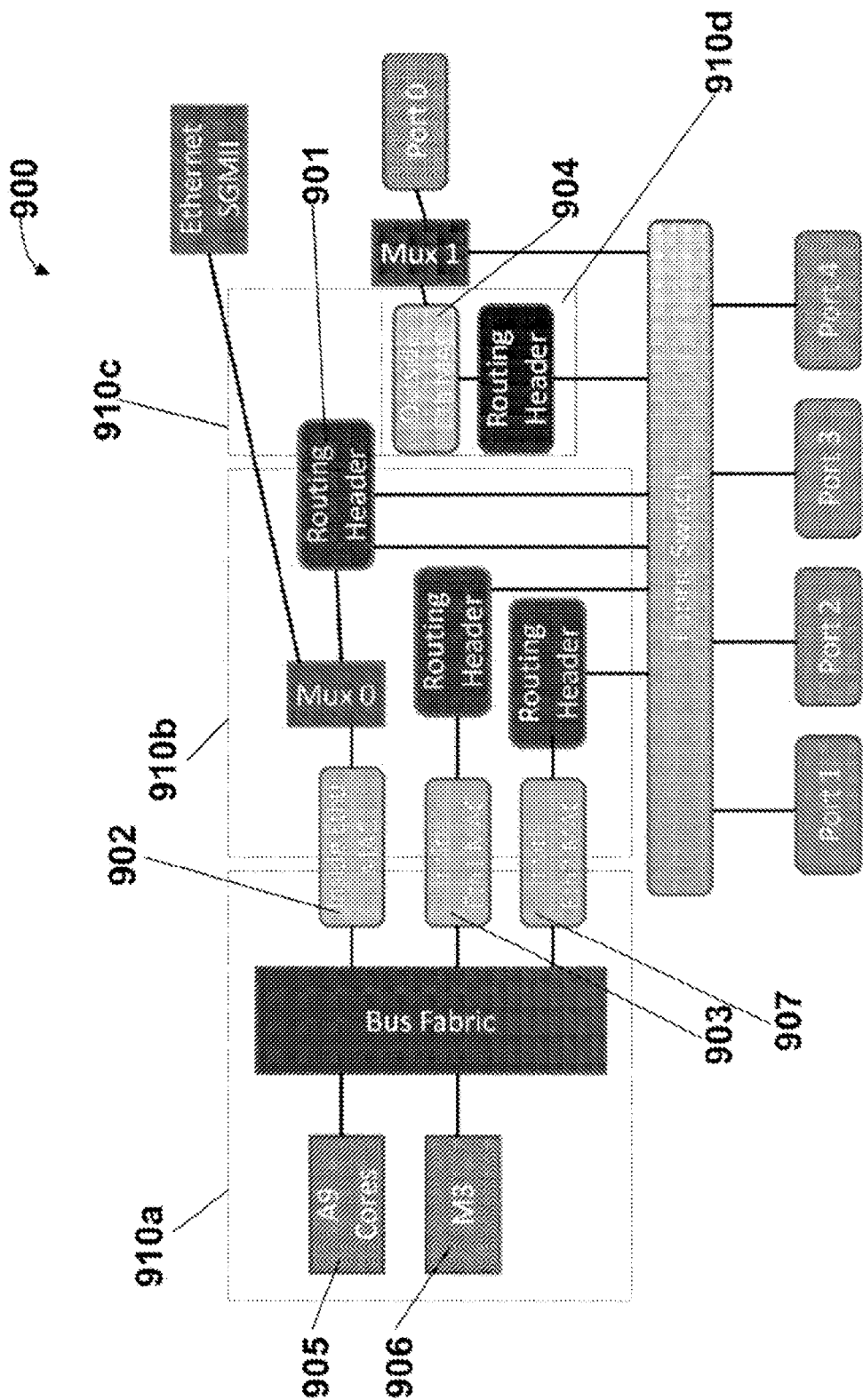
FIG. 5 is a server node fabric switch with a fabric management unit.

As described in co-pending patent application Ser. No. 12/794,996 (which is incorporated herein by reference), FIG. 5 illustrates the internal architecture of a server node fabric switch. FIG. 5 shows a block diagram of an exemplary switch 900 according to one aspect of the system and method disclosed herein. It has four areas of interest 910a-d. Area 910a corresponds to Ethernet packets between the CPUs and the inside MACs. Area 910b corresponds to Ethernet frames at the Ethernet physical interface at the inside MACs, that contains the preamble, start of frame, and inter-frame gap fields. Area 910c corresponds to Ethernet frames at the Ethernet physical interface at the outside MAC that contains the preamble, start of frame, and inter-frame gap fields. Area 910d corresponds to Ethernet packets between the processor of routing header 901 and outside MAC 904. This segmented MAC architecture is asymmetric. The inside MACs have the Ethernet physical signaling interface into the routing header processor, and the outside MAC has an Ethernet packet interface into the routing header processor. Thus the MAC IP is re-purposed for inside MACs and outside MACs, and what would normally be the physical signaling for the MAC to feed into the switch is leveraged. MAC configuration is such that the operating system device drivers of A9 cores 905 manage and control inside Eth0 MAC 902 and inside ETH1 MAC 903. The device driver of management processor 906 manages and controls Inside Eth2 MAC 907. Outside Eth MAC 904 is not controlled by a device driver. MAC 904 is configured in Promiscuous mode to pass all frames without any filtering for network monitoring. Initialization of this MAC is coordinated between the hardware instantiation of the MAC and any other necessary management processor initialization. Outside Eth MAC 904 registers are visible only in the management processor 906 address map. Interrupts for Outside Eth MAC 904 are routable only to the management processor.

Figure 2:
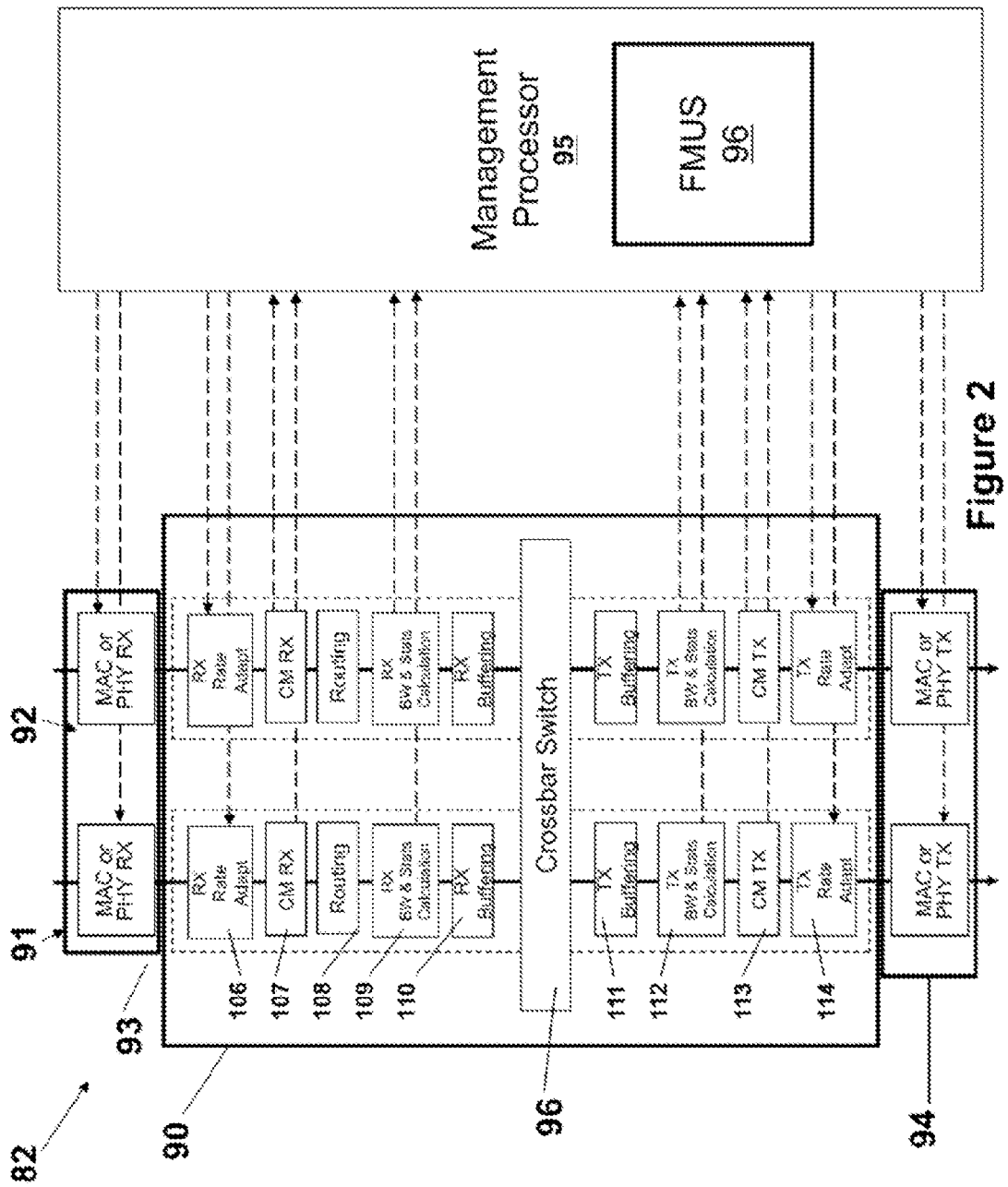
FIG. 2 illustrates an example of a node which contains a fabric switch and a processor which runs fabric management software.

FIG. 2 shows a node 82 which contains a fabric switch (90) and a processor (95) which includes a fabric management unit 96 that manages the fabric switch 90. The node 82 may be a server node, for example. In one embodiment, the fabric management unit 96 may be a piece of fabric management software that may be a plurality of lines of computer code that are executed by the processor 95. Alternatively, the fabric management unit 96 may be a piece of hardware separate from the processor 95, a piece of hardware that performs the processes described below, firmware or other code stored on a memory from which it can be executed or may be a standalone hardware that incorporated software and the fabric management unit 96 is not limited to any particular implementation. An example of the fabric management processor 95 corresponds to the management processor embedded with a server SoC as illustrated by the M3 microcontroller 906, illustrated in FIG. 5.

FIG. 3 illustrates a method 200 for dynamic link management by the fabric management unit of the node in FIG. 2. In particular, once it is active, the fabric management unit configures the fabric switch through register writes 202. When the fabric switch is active, the fabric management unit receives interrupts from the fabric switch based on measurements and statistics (204) and receives interrupts based on the reception and transmission of Control Messages (206). The fabric management unit then makes decisions on the adjustment of Link Rates based on measurements and statistics while following rules and policies (208).

Returning to FIG. 2, the fabric switch 90 is comprised of two or more channels (91 and 92). Each of the channels is connected to a PHY at each end of the channel that provide an interconnect link to a neighbor server node or to a local MAC on the server node. In FIG. 2, the PHY or MAC is shown split into a receive (RX) portion (93) and a transmit (TX) portion (94) and packet dataflow is from the top of the diagram to the bottom of the diagram. A crossbar switch (96) allows packets received on one channel to be routed to and transmitted on another channel based on the addresses of the packets. The portion of the channel which precedes the crossbar switch in the data flow is referred to as the RX channel, while the portion of the channel which is after the Crossbar Switch is referred to as the TX channel.

In the node in FIG. 2, packets are first received by an RX Rate Adaptation block (106) which detects the RX Link Rate (the rate at which packets are being received) and interrupts the processor (95) when the RX Link Rate changes. In addition, the RX Rate Adaptation block (106) converts the packets from the RX Link Rate to a common internal rate used inside the channel. The detection is described below in more detail in the Hardware Support for Link Rate Changes section below.

The RX channel also has a Control Message RX (CM RX) block (107) that receives Control Messages, removes them from the channel, and interrupts the processor when the control messages are received. The RX channel also has a routing block (108) that inspects the packet and determines to which channel the packet should be routed based on the address in the routing header of the packet. The RX channel also has an RX bandwidth and statistics calculation block (109) that measures bandwidths, keeps statistics, and interrupts the processor when thresholds are reached. The measurement and thresholds are described in more detail below.

The RX channel also has an RX FIFO block (110) that temporarily stores packets until they can be sent through the Crossbar Switch. A TX FIFO block (111) temporarily stores packets as they are being transmitted out of the channel. The TX channel also has a TX Bandwidth and statistics calculation block (112) that measures bandwidths, keeps statistics, and interrupts the processor when thresholds are reached. The TX channel also has a Control Message TX (CM TX) block (113) that allows the processor to transmit Control Messages on the channel. The TX channel also has a TX rate adaptation block (114) that converts the packet from the internal common rate to any other Link Rate. The other channel has similar elements that operate in a similar manner that are not described further herein.

The control of Link Rates of the channels is under the control of fabric management unit 96, however, the fabric switch 90 has some hardware features meant to aid in the decisions of when to change Link Rates to increase performance or to decrease power consumption of the Links Measurement of Bandwidth Utilization The fabric switch performs the process of determining bandwidth utilization. The determination of interconnect link utilization is a first stage of the mechanism to measure bandwidth utilization. The link utilization is determined by making measurements of various types of bandwidths, arbitration scores, and statistics. Bandwidths and arbitration scores are measured as an average over a period of time called the Utilization Measurement Interval. The period of time constituting the Utilization Measurement Interval is programmable by the fabric management unit. This allows quicker or slower reaction times to changes in link utilization. In our implementation, the system has selectable Utilization Measurement Intervals of 100 usec, 1 ms, 10 ms, and 100 ms, but these are only examples. In our implementation the time it takes to change Link Rate is on the order of 10 usec for all rates except 1 Gb/sec and on the order of 100 usec for 1 Gb/sec.

The bandwidths are often measured in Kbps or Mbps for convenient use and are measured for fabric switch channels connected to computing elements on the same node through an internal MAC, as well as communication across interconnect links between nodes. The measured bandwidths are stored in registers and can be read by the fabric management unit to feed into the decision criteria for Link Rate changes. The link utilization measurements often include one or more of the following (described in more detail below):

The RX Bandwidth
The TX Bandwidth
The Requested Bandwidth.
The RX Flow Control Bandwidth
The TX Flow Control Bandwidth
The Arbitration Score
TX Pause Frame or Flow Control Message Statistics
RX Pause Frame or Flow Control Message Statistics The RX Bandwidth and TX Bandwidth are measurements of the current link utilization based on the packets that are actively being received or transmitted over the interconnect link. The RX and TX Bandwidths can range from 0 up to the maximum Link Rate.

The requested bandwidth is a measurement of how much demand there is for a particular TX channel regardless of whether the Crossbar Switch and FIFOs are able to support that much demand. The Requested Bandwidth is calculated after the fabric switch has determined where the received packet will be routed. The fabric switch sums up all the bandwidth of all packets received on all of the RX channels that are destined for a particular TX channel. The Requested Bandwidth is calculated for packets even if the RX FIFO is overflowing. So Requested Bandwidth indicates the amount of demand, not just the amount of traffic the Crossbar Switch and FIFOs were able to support based on how the Link Rates are currently set. The requested bandwidth will range in value from 0 to the number of channels times the maximum Link Rate. For example, in a fabric switch with 7 channels that operate each at a maximum Link Rate of 10 Gbps, then the Requested Bandwidth would range from 0 to 70 Gbps. The requested bandwidth allows the fabric management unit to know the amount of aggregated demand and help in the decision as to how much to increase or decrease the Link Rate. For example, if a link has possible Link Rates of 2.5 Gbps, 5.0 Gbps, 7.5 Gbps, and 10 Gbps, and a link is currently running at 2.5 Gbps, if the Requested Bandwidth is measured at 12 Gbps, the fabric management unit will know to raise the Link Rate to 10 Gbps rather than to 5.0 Gbps or 7.5 Gbps in order to support the current demand. In the same way, the Requested Bandwidth allows the fabric management unit to know how much it can lower the Link Rate to reduced power consumption while still supporting the aggregated demand.

The fabric switch also measures RX Flow Control Bandwidth and TX Flow Control Bandwidth which indicate how much the bandwidth was reduced due to flow control. The RX Flow Control Bandwidth is measured by calculating the amount of bandwidth that could have been received during the period of time that the channel was sending Pause Frames or Flow Control Messages and pausing its link partner node. The TX Flow Control Bandwidth is measured by calculating the amount of bandwidth that could have been transmitted during the period of time that the TX channel was paused due to receiving Pause Frames or Flow Control Messages from the neighbor node.

The Arbitration Score measurement is meant to help determine when the Link Rate should be increased to relieve congestion through the Crossbar Switch. Since packets can be coming from any channel and going to any other channel, just looking at the RX Bandwidth is not an effective way of determining which TX Channel's Link Rate needs to be increased. So an Arbitration Score is determined for each of the TX channels which is an indicator of how many RX channels have been arbitrating for the TX channel and how long those RX channels have been waiting to win arbitration through the Crossbar Switch. The arbitration score uses an arbitrary range (for example, from 0 to 8000 for a fabric switch with 8 channels) and a low value means that the RX channels have not been blocked much waiting to win arbitration for the TX channel over this Measurement Interval. A high number means that many RX channels have been blocked for long periods of time waiting to win arbitration for the TX channel in the over the Measurement Interval. Some boundary cases are given below as examples of the Arbitration Score values:

If only a single RX channel was routing to the TX channel, the Arbitration Score would be 0 for that TX channel (since there is no competition for the TX channel).

If a single RX channel was blocked from routing to the TX channel for the entire Measurement Interval, then the Arbitration Score for that TX channel would be 1000.

If a three RX channels were blocked from routing to the TX channel for half of the Measurement Interval, then the Arbitration Score for that TX channel would be 1500.

The TX Pause Frame statistics may be another indicator that the Link Rates of the TX channels of a node need to be increased since the RX FIFO is overflowing and pause frames are being sent. The RX Pause Frame statistics may be another indicator that the TX Link Rate may be reduced to conserve power since the neighbor node is indicating that it cannot keep up at the current rate. The RX FIFO and TX FIFO packet counts and available byte counts may also be useful in this regard.

Threshold Interrupts and Utilization Measurement Interval Interrupt

The fabric switch 90 contains registers which allows the fabric management unit to configure High and Low Threshold values for the various link utilization measurements. The fabric switch monitors the current link utilization measurements and generates interrupts to the processor 95 when any programmable thresholds have been crossed. Thresholds and alarms may be provided for RX Bandwidth, TX Bandwidth, Requested Bandwidth, RX Flow Control Bandwidth, TX Flow Control Bandwidth and/or Arbitration to identify when the Link Rate of a channel should be increased or decreased based on utilization.

The bandwidths and Arbitration Score are computed as averages over the Utilization Measurement Interval. The fabric switch also provides an interrupt at the end of the Utilization Measurement Interval, so that fabric management unit can read all the measurements and make decisions on whether to change link rates, processor bus clock frequencies, and processor bus arbitration policies in order to tradeoff performance and power savings.

Link Rate Configuration

As previously described, the dynamic link configurations can be done with any link interconnect technology which allows the dynamic modification of either the link speed or link width. The Link Rate configuration is done based on the measurement and statistics described above. In one example implementation, the following link characteristics are defined:

A four lane link

The lanes have configurable modes (speeds) per lane: 1.25 Gb/sec (SGMII), standard XAUI (3.125 Gb/sec), double XAUI (6.25 Gb/sec), and high-speed SerDes (above double XAUI speed, e.g. 10-12 Gb/sec).

The links can be configured to run with 1, 2, 3, or 4 active lanes.

When running in the SGMII mode, the selection of one through four lanes allows the configuration of 1, 2, 3, and 4 Gb/sec. When running in XAUI mode, selection of one through four lanes allows the configuration of 2.5, 5.0, 7.5, and 10 Gb/sec. When running in double XAUI mode, selection of one through four lanes allows the configuration of 5, 10, 15, and 20 Gb/sec.

The power that a particular link consumes will vary based on the number of active lanes, and the speed in which the lanes are configured (e.g. 1.25 Gb/sec for SGMII, 3.125 Gb/sec for XAUI, or 6.25 Gb/sec for double XAUI). The fabric management unit may maintain a way to map the number of active lanes and the link speed (collectively known as the Link Rate) to an estimation of consumed link power to aid in the determination of how the Link Rates should be set to optimize power and performance based on the current demand.

Combination PHYs are used to multiplex multiple PHY and PCS (Physical Coding Sublayer) technologies (SGMII, XGMII, double XAUI) into a single physical PHY exposed off the chip as shown in FIG. 2. The fabric switch has one or more hardware multiplexers, controlled by the fabric management unit, that allow the fabric management unit to configure the Link Rates. This mechanism allows the Link Rate for the RX Channel and the Link Rate for the TX Channel to be set independently.

Hardware Support for Control Messages

The fabric switch 90 hardware implements a special class of messages that can be sent between link partners (e,g, different nodes) called Control Messages. These Control Messages are very low latency since they bypass the TX FIFO and can be sent even when there are already packets in the TX FIFO or when the TX FIFO is full.

The control messages are a special type of packet for low latency communication between link partners. The control messages may be very short (20 bytes) compared with a normal routing frames (84 to 9042 bytes), contain a special routing header that identifies them as being control messages rather than normal routing frames, are low latency since they bypass the TX and RX FIFOs, and carry a small payload that is used to communicate link rate negotiation (amongst other uses).

In one embodiment, the fabric switch 90 can send Control Messages distributed across all active lanes just as normal packets are sent. When Control Messages are sent distributed across all active lanes, the transmitting link partner and the receiving link partner must have their Link Rates set the same for the Control Message to be received. In this embodiment, Link Rate changes must be carefully coordinated by the link partners so that they always have their Link Rates set the same. For example, if the sending node does not get a response to the Control Message it sends, the sending node may change its Link Rate and resend the Control Message until it receives a response from the link partner.

Figure 4A:
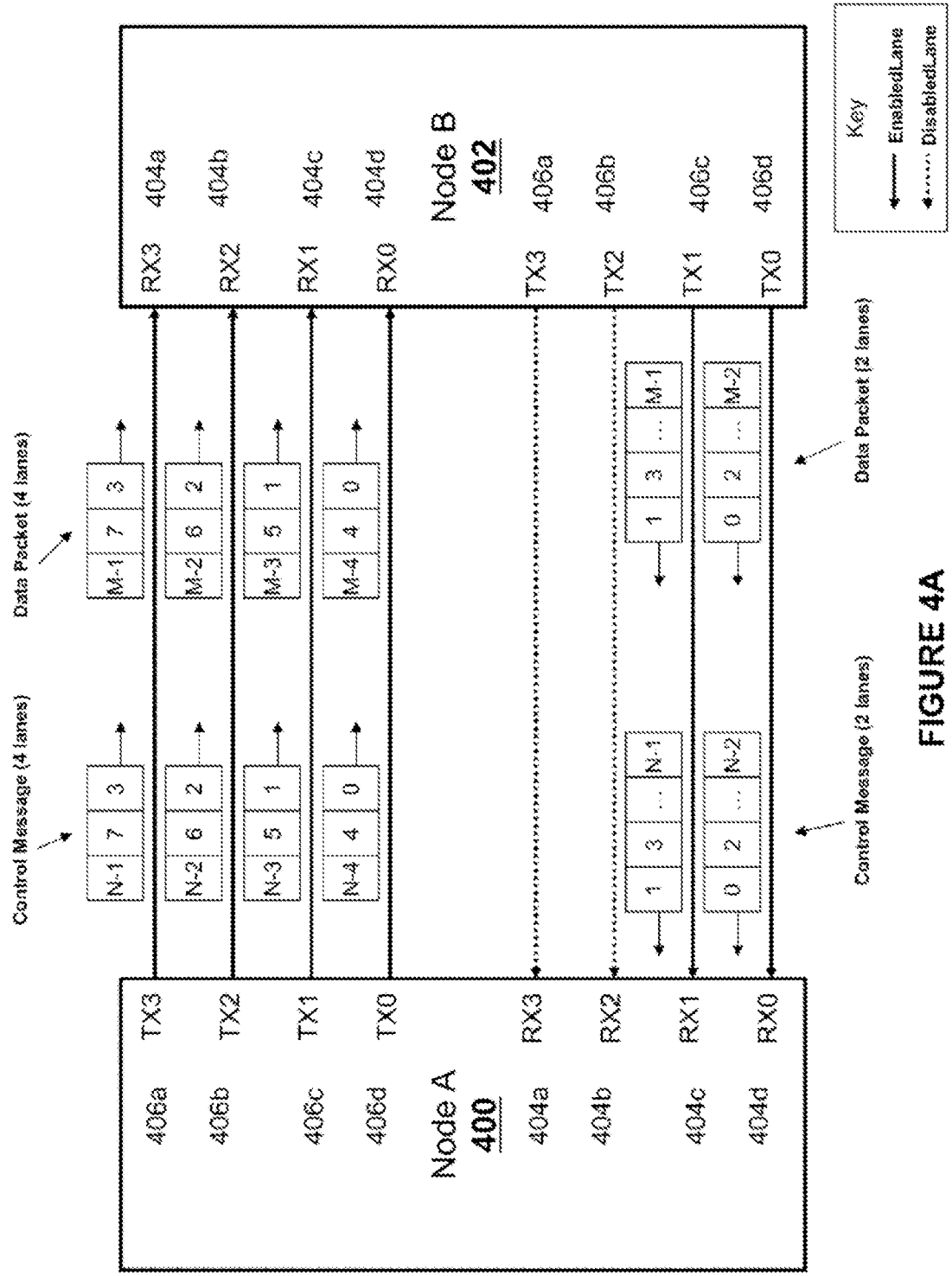
FIGS. 4A and 4B illustrate an example of link rate change using the network system.
Figure 4B:
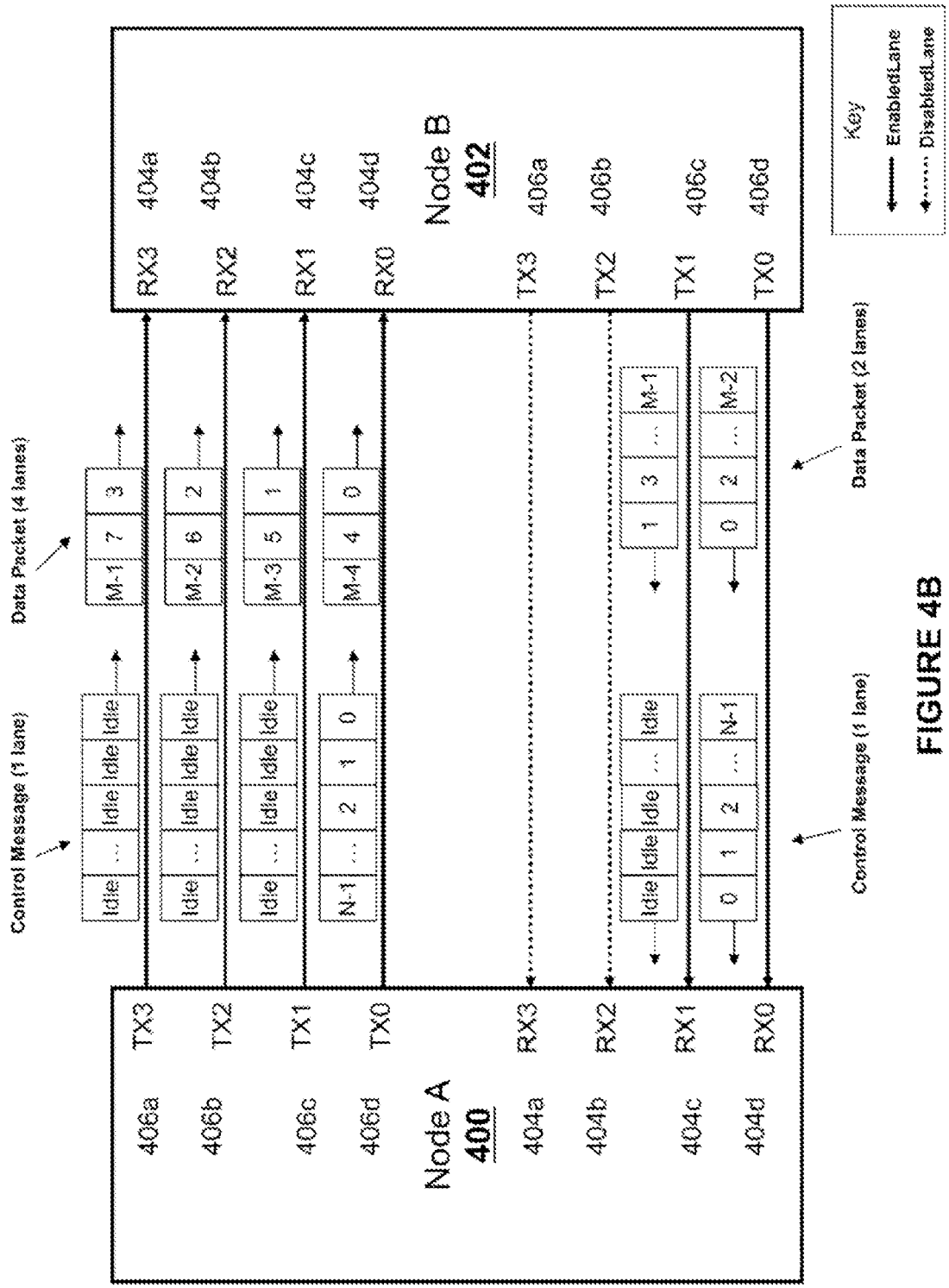

In an alternate embodiment, the fabric switch 90 can always send Control Messages in Lane 0 regardless of which Link Rate is selected while normal packet traffic would be sent distributed across all active lanes. This allows Control Message communication regardless of how many active lanes are currently selected since at least one lane will always be enabled when the link is active. FIGS. 4A and 4B illustrates an example of Link Rate change negotiation using Control Messages in the network system in which two nodes (Node A 400 and Node B 402) each have multiple lanes (four receive lanes 404a-404d labeled RX0-RX3 and four transmit lanes 406a-406d labeled TX0-TX3) connecting each other. The Control Message can be received by Node A regardless of how many lanes have been enabled. In particular, FIG. 4A shows an example of a link rate change negotiation between Node A 400 and Node B 402 in which the Lane 0 and 1 (two lanes, RX0 and RX1) are enabled in Node A for control messages on the RX side and four lanes (TX0-TX3) are enabled for control messages on the TX side of Node A. Thus, in the example in FIG. 4A, the control message lanes in each direction (TX and RX of Node A) are asymmetric and the lanes not being used for control messages are disabled.

In the example in FIG. 4B, Node B 402 sends a control message (CM) only over Lane 0 to Node A (RX0) on the RX side, but uses two lanes for data packets. In the example in FIG. 4B, the other lane that has data packets, but not control messages receives idle packets. The other two lanes RX2 and RX3 are disabled as shown by the dotted lines. On the TX side of Node A 400, one lane (TX0) is used for control messages and the other lanes are active, but have idle packets instead of control messages. On the TX side of Node A, there are four lanes of data packets so that all of the lanes are active. As in FIG. 4A, the control message lanes in each direction (TX and RX of Node A) are asymmetric and may also be different from the data packet lanes.

Hardware Support for Link Rate Changes

There is logic in the fabric switch Receive Rate Adaptation block 106 which looks at the frame preambles to detect what rate is being currently being received regardless of what Link Rate the RX Rate Adaptation block is currently configured to receive. This logic can generate an optional interrupt when the received Link Rate changes. This becomes an additional input to the fabric management unit.

Control messages can be used to negotiate rates between link partners using a typical request/acknowledge protocol. Alternatively, Link Rates could just be changed by the TX side of the link and the RX side could detect the new rate, generate an interrupt, and the fabric management unit on the RX side could change the rate to match.

The Link Rate can be communicated using a Pause Frames with special Pause Time encodings or a special sequence of data will be transmitted "in-band" over the Link once the TX FIFO has been stopped and idle characters have been sent for a period of time.

Fabric Manager Unit

Rate changes are most likely made based on the Requested Bandwidth on the TX side of the link. However, other measurements could be used by software in the decision making process such as RX Bandwidth, TX Bandwidth, RX Pause Frames statistics counts, TX Pause Frame statistics counts, and RX/TX Flow Control Bandwidths.

Multiple techniques can be used by the fabric manager to use the Arbitration Score Alarm—either incrementally increasing the Link Rate when the Alarm event occurs or increasing the Link Rate to the maximum and then backing off based on the TX Bandwidth Alarms. Looking at the measured RX Bandwidths may also be helpful in making the determination of how much the Link Rate should be increased. The fabric manager can also monitor the channel statistics to determine whether Link Rate, processor bus clock frequency, or processor bus arbitration policies need to be changed. The fabric management unit can also track bandwidth usage per-link over time and use that information to guide how to change a link's bandwidth. For example, a link with historically heavy usage will follow a slower set of adjustments to lower speeds than a link with historically lower usage that has experience a brief high bandwidth moment. The Fabric Manager may also be able to configure the delay imposed by a Pause Frame to level traffic surges allowing a link to remain at a more power-efficient lower speed rather than transitioning up and down to handle temporary bursts of network traffic.

Fabric Manager Unit Policies

The fabric manager unit exposes, to the system administrator, a number of policies and rules to allow the customer to have some control over the dynamic link adjustments. The rules and policies may include, for example:

Static or dynamic number of links or a default number of links.
  Static or dynamic speed and rate mode for each link and/or a default speed and rate mode for the each link.

TX and RX channels can vary independently or should be changed together.

Max power use for network traffic per node. The ability to constrain the total power used by the network PHYs on a node to a set limit.

Max power use for network traffic for the whole fabric. All of the nodes in the fabric collaborating to distribute a power budget specifically for network operations to limit overall power usage.

With the dynamic routing table, it will be possible to route traffic to take maximum advantage of intermediate nodes that provide traffic aggregation. In low network traffic situations, some intermediate node's links could be turned all the way off to save power while traffic is routed to the remaining intermediate nodes whose links are running at higher speeds.

When the fabric management unit makes the decision to change the Link Rate for one of its Link Channels, it should communicate with the neighbor that shares the Link to indicate that the Link Rate will be changed. The communication of the upcoming Link Rate change ensures that both nodes don't independently decide to change the Link Rate at the same time and it also allows the neighbor to stop its TX FIFO so that no packets are lost while changing Link Rates.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A method comprising:
   measuring a speed of each link in a first switch, wherein the first switch includes a plurality of links to a plurality of Ethernet ports;
   receiving a set of control messages from a second switch; and
   changing the speed of each link in the first switch based on statistics regarding the set of control messages, wherein the statistics are calculated at a statistics calculation module based on historical data.

2. The method of claim 1, wherein the first switch has a set of rules to control the speeds of the plurality of links.

3. The method of claim 2, wherein the rules comprise one of a configuration of a bandwidth, a configuration of the speed of a link, a control of the speed of a transmit channel and a receive channel of the link, a maximum power used by the switch, or a dynamic routing of traffic.

4. The method of claim 1, wherein the set of control messages bypasses a transmit buffer of the second switch.

5. The method of claim 1, wherein the statistics are calculated at a receive channel and at a transmit channel.

6. The method of claim 1, wherein each link further comprises a plurality of lanes over which data is communicated, and wherein the set of control messages is distributed over each lane.

7. The method of claim 1, further comprising:
   measuring a statistic regarding each link; and
   determining a rate adjustment for each link based on the measured statistic.

8. The method of claim 7, wherein the statistic is an arbitration score indicative of how long a receive channel has been waiting to win arbitration of the first switch.

9. The method of claim 7, wherein the statistic is a bandwidth utilization of each link.

10. The method of claim 1, wherein each link comprises a receive channel having one or more receive lanes and a transmit channel having one or more transmit lanes, wherein the method further comprises:
    determining a number of active receive lanes that receive data;
    determining a number of active transmit lanes that transmit data;
    determining a receive rate of the active receive lanes; and
    determining a transmit rate of the active transmit lanes.

11. The method of claim 10, wherein the number of active receive lanes is different than the number of active transmit lanes.

12. The method of claim 10, wherein the receive rate is different than the transmit rate.

13. The method of claim 10, further comprising:
    receiving a message on a receive channel;
    determining the received message is a control message;
    removing the control message from the receive channel; and
    interrupting a processor based on receiving the control message.

14. A non-transitory computer-readable medium having instructions stored thereon, the instructions comprising:
    instructions to measure a speed of each link in a first switch, wherein the first switch includes a plurality of links to a plurality of Ethernet ports;
    instructions to receive a set of control messages from a second switch; and
    instructions to change the speed of each link in the first switch based on statistics regarding the set of control messages, wherein the statistics are calculated at a statistics calculation module based on historical data.

15. The non-transitory computer-readable medium of claim 14, wherein the first switch has a set of rules to control the speeds of the plurality of links.

16. The non-transitory computer-readable medium of claim 15, wherein the rules comprise one of a configuration of a bandwidth, a configuration of the speed of a link, a control of the speed of a transmit channel and a receive channel of the link, a maximum power used by the switch, or a dynamic routing of traffic.

17. The non-transitory computer-readable medium of claim 14, wherein the set of control messages bypasses a transmit buffer of the second switch.

18. The non-transitory computer-readable medium of claim 14, wherein each link further comprises a plurality of lanes over which data is communicated, and wherein the set of control messages is received over a lane 0.

19. The non-transitory computer-readable medium of claim 14, wherein each link comprises a receive channel having one or more receive lanes and a transmit channel having one or more transmit lanes, wherein the instructions further comprise:
    instructions to determine a number of active receive lanes that receive data;
    instructions to determine a number of active transmit lanes that transmit data;
    instructions to determine a receive rate of the active receive lanes; and
    instructions to determine a transmit rate of the active transmit lanes.

20. The non-transitory computer-readable medium of claim 19, wherein the instructions further comprise:
    instructions to receive a message on a receive channel;
    instructions to determine the received message is a control message;
    instructions to remove the control message from the receive channel; and instructions to interrupt a processor based on receiving the control message.

\* \* \* \* \*